(No Model.)  
J. M. ALEXANDER.  
CULTIVATOR AND SEED DROPPER OR PLANTER COMBINED.  
No. 324,208. Patented Aug. 11, 1885.
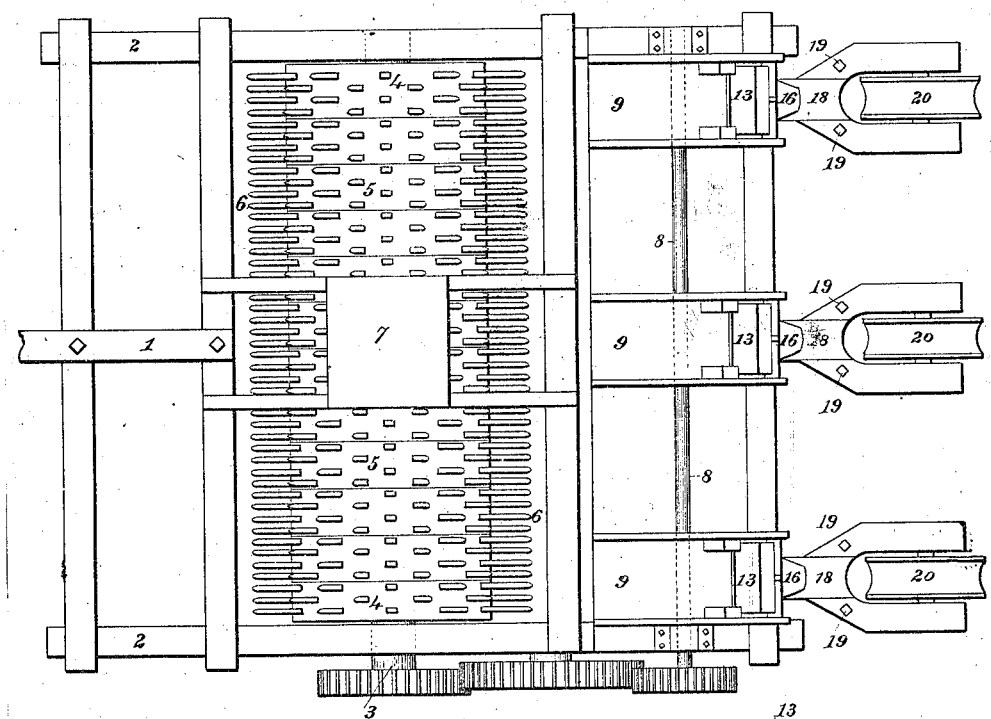
FIG. I.
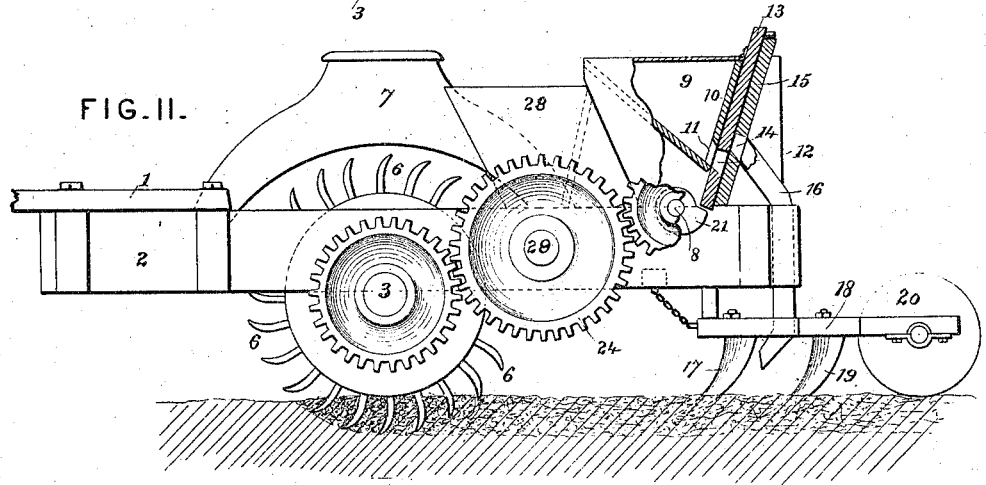
FIG. II.
Attest:  
Geo. P. Smallwood  
Edward Starr
Inventor:  
James M. Alexander  
Knight Bros.  
attys.

(No Model.) 2 Sheets—Sheet 2.
J. M. ALEXANDER.
CULTIVATOR AND SEED DROPPER OR PLANTER COMBINED.
No. 324,208. Patented Aug. 11, 1885.
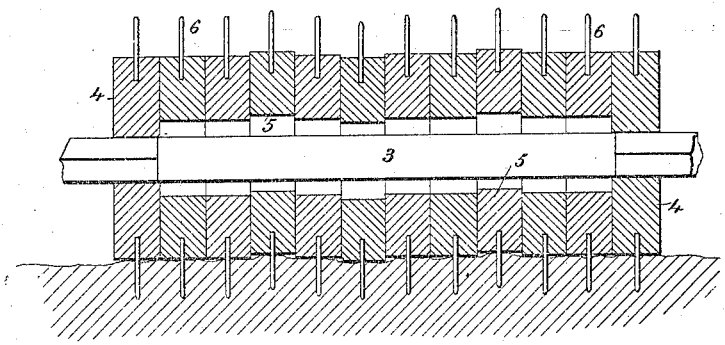
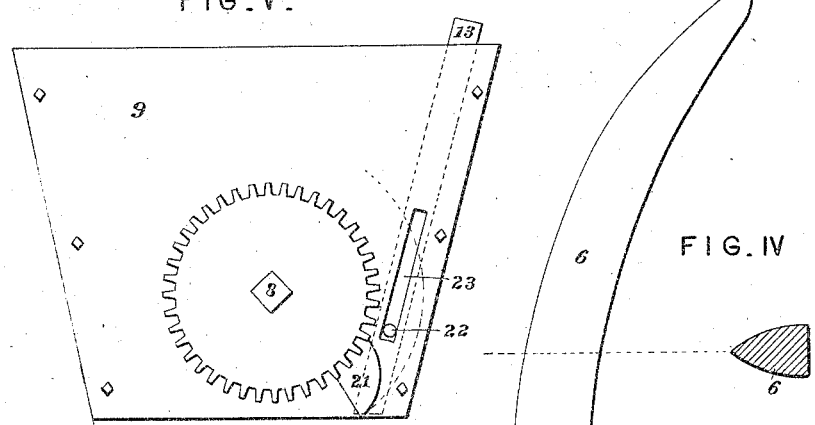
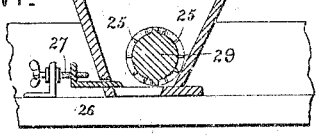
Attest:
Geo. T. Smallwood
Edward Stutz
Inventor:
James M. Alexander
By Knight Bros.
attys.

UNITED STATES PATENT OFFICE.

JAMES M. ALEXANDER, OF CLARKSBURG, WEST VIRGINIA.

CULTIVATOR AND SEED DROPPER OR PLANTER COMBINED.

SPECIFICATION forming part of Letters Patent No. 324,208, dated August 11, 1885.

Application filed August 8, 1884. (No model.)

*To all whom it may concern:*

Be it known that I, JAMES M. ALEXANDER, a citizen of the United States, residing at Clarksburg, in the county of Harrison and State of West Virginia, have invented certain new and useful Improvements in Combined Cultivators and Seed Droppers or Planters, of which the following is a specification.

My invention relates, primarily, to an implement for the cutting and loosening of the ground in which wheat or other grain or grass is planted when the ground has become so packed and hard as to interfere with the free growth of the grain.

To loosen the ground I employ a roller, preferably made in sections, in the manner presently to be described, such roller being provided with teeth so arranged that their convex cutting-edges will be presented rearwardly as said teeth enter and leave the ground, so as to cut into the ground when the roller is dragged along. This form of tooth also allows it to leave the ground in such a manner as to avoid dragging up the roots of the grain. The teeth are preferably arranged quincuncially, so as to break joints and insure as complete a cutting up of the surface as possible.

I arrange the frame of the cultivator in such a manner as to enable the mounting in the rear thereof of a seed-sowing or corn-planting attachment, being preferably formed in the following manner: The back of the seed box or hopper is open at bottom, and in its rear is arranged a slide, to which a reciprocation vertical or nearly-vertical motion is alternately imparted by gravity and by a cam operated from the cultivator-roller. A hole in the slide is arranged to register with the hole in the hopper when down, and with the discharge-aperture into the seed-tube when elevated. Any number of such droppers across the width of the machine may be employed, according to the number of rows being planted.

In order that my invention may be more fully understood, I will proceed to describe it with reference to the accompanying drawings, in which—

Figure I is a plan of the cultivator with cornplanter attachment. Fig. II is a side elevation of the same with the seed-hopper in vertical section. Fig. III is a detail sectional view of the preferred form of roller. Fig. IV is a detail view of one of the cultivator-teeth in elevation and section. Fig. V is a detail elevation of a modified form of seed-hopper. Fig. VI is a detail view of the fertilizer-sower in transverse section.

1 is the tongue, and 2 the frame, of my improved implement. Mounted transversely in the side beams of the frame is the shaft 3, to which the two outer sections, 4, of the roller or cultivator are fixed by square joint or key. The intermediate sections, 5, of the roller have enlarged bearings to permit slight lateral movement upon the shaft, so that the external surface of the roller will adapt itself to the contour of the ground being gone over, as shown in Fig. III.

Arranged, preferably quincuncially, as shown, around the surface of the roller-section are teeth or blades 6, which are fixed that their sharp convex edges will be presented rearwardly when they are entering and leaving the ground, so that as the roller is dragged forward the teeth will cut into the surface of the ground, and when being withdrawn from the ground will avoid tearing the roots of the wheat. These teeth are fixed by being driven directly into the roller, if a solid roller is employed, or if the roller is a hollow frame they may be fastened in place by screw-thread and nut.

A seat, 7, is supported on the frame over the roller for the driver.

The outer end of cultivator-shaft 3 is connected, by gearing, belt, or other means, with the shaft 8, operating the seed-droppers. Gearing is here shown employed, and is preferable on account of its positive action.

The seed hopper or hoppers 9 are supported on the frame 2 over the shaft 8, and are shaped interiorly to direct the seed against the back 10, in the bottom of which is formed an opening, 11, through which corn or other seed is allowed to flow into the pocket 12 in the slide 13 when said slide is in its lowermost position. (Shown in Fig. II.) The size of the pocket 12 is varied according to the number of grains to be dropped, and this adjustment may be accomplished by the use of separate slides, or by graduating the size of the opening in any well-known manner. An opening, 14, in the outer wall, 15, of the hopper registers with the pocket 12 when the slide is in its elevated position, and allows the corn to fall into the seed-tube 16, whence it falls in rear of the opening-share 17, carried by an independent frame, 18, which is connected to the frame 2 by chain, clevis, or other means. Two shares, 19, following one on each side of the furrow, cover the seed, and a roller, 20, supporting the rear end of the frame 18, slightly compresses the earth over the seed.

The dropper-operating shaft may actuate the slides 13, directing its cams or wipers 21, bearing underneath the slide; or, as in Fig. V, a stud or lug, 22, on the slide may be made to project through and travel in a slot, 23, in the side of the hopper, being supported by a similar cam, 21, the slides being in each case lifted on each revolution of the shaft, and allowed to fall to their places by gravity or a spring.

When required, the implement may be arranged to have the seed-hopper and shaft movable, so that they may be replaced by a fertilizer-hopper; or the fertilizer-sower 28 may be placed, as shown in Fig. II, between the cultivator and the corn-hopper, and have its shaft 29 operated by the idle-gear 24. When coarse fertilizing material is used, agitating-arms 25 are placed upon the shaft 29, for scattering the manure and insuring a constant feed. A slide, 26, is arranged in the opening at the bottom of the hopper 28, and is adapted to be adjusted by set screw or screws 27, to regulate the width of the opening according to the quantity and quality of the dressing to be sown.

Having thus described my invention, the following is what I claim as new therein and desire to secure by Letters Patent:

The combination, with the main frame 2, the roller 5, supporting the same and having cutting-teeth 6, and the seed-hopper 9, supported by said main frame and having the spout 16, of the supplemental frame 18, flexibly connected to said main frame in rear of the roller 5 and having the opening-share 17, the delivery end of the seed-spout 16, located directly behind said opening-share, the covering-shares 19, located behind and on each side of the said spout, and the roller 20, located behind said covering-shares, substantially as and for the purpose set forth.

J. M. ALEXANDER.

Witnesses:
 OCTAVIUS KNIGHT,
 HARRY E. KNIGHT.